United States Patent
Agarwal et al.

(10) Patent No.: US 11,802,542 B2
(45) Date of Patent: Oct. 31, 2023

(54) METHOD FOR INSTALLING AND RETAINING A BUSHING IN A BEARING BLOCK OF A ROTOR BLADE JOINT

(71) Applicant: General Electric Company, Schenectady, NY (US)

(72) Inventors: Rohit Agarwal, Simpsonville, SC (US); Andrew Mitchell Rodwell, Greenville, SC (US); Amir Riahi, Simpsonville, SC (US); Mohammad Salah Attia, Niskayuna, NY (US); Donald Joseph Kasperski, Simpsonville, SC (US); Jianqiang Chen, Spring, TX (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/290,034

(22) PCT Filed: Nov. 1, 2018

(86) PCT No.: PCT/US2018/058699
§ 371 (c)(1),
(2) Date: Apr. 29, 2021

(87) PCT Pub. No.: WO2020/091790
PCT Pub. Date: May 7, 2020

(65) Prior Publication Data
US 2022/0120255 A1    Apr. 21, 2022

(51) Int. Cl.
*F03D 1/06* (2006.01)
*F03D 13/00* (2016.01)

(52) U.S. Cl.
CPC ........... *F03D 1/0675* (2013.01); *F03D 13/00* (2016.05); *F05B 2230/604* (2013.01);
(Continued)

(58) Field of Classification Search
CPC .............. F03D 1/0675; F05B 2230/604; F05B 2240/302; F16B 19/02; F16C 33/201; F16C 2208/32; F16C 23/045
See application file for complete search history.

(56) References Cited

U.S. PATENT DOCUMENTS

| 851,196 A | 4/1907 | Bevans et al. |
| 4,474,536 A | 10/1984 | Gougeon et al. |

(Continued)

FOREIGN PATENT DOCUMENTS

| EP | 2186622 A1 | 5/2010 |
| EP | 3144526 A1 | 3/2017 |

(Continued)

OTHER PUBLICATIONS

Engineers Edge, Bushing and Plain Bearings Press or Shrink Fit Design and Application, 2011, Retrieved from the Interneton Aug. 12, 2022, URL: https://web.archive.org/web/20110709083536/http://www.engineersedge.com/bearing/bushing_press_fit.htm (Year: 2011).*

(Continued)

*Primary Examiner* — Courtney D Heinle
*Assistant Examiner* — Sang K Kim
(74) *Attorney, Agent, or Firm* — Dority & Manning, P.A.

(57) ABSTRACT

A rotor blade for a wind turbine includes a first blade segment and a second blade segment extending in opposite directions from a chord-wise joint. Each of the first and second blade segments includes at least one shell member defining an airfoil surface. The rotor blade also includes one or more pin joints for connecting the first and second blade segments at the chord-wise joint. The pin joint(s) includes one or more pin joint tubes received within the pin joint slot(s). The pin joint slot(s) are secured within a bearing block. Further, a gap is defined between the pin joint slot(s) and the bearing block. Moreover, the rotor blade includes a (Continued)

shim within the gap between the pin joint slot(s) and the bearing block so as to retain the pin joint slot(s) within the bearing block. In addition, the shim is constructed of a liquid material that hardens after being poured into the gap.

6 Claims, 7 Drawing Sheets

(52) U.S. Cl.
CPC ... *F05B 2240/302* (2013.01); *F05B 2240/307* (2020.08); *F05B 2260/30* (2013.01); *F05B 2280/6003* (2013.01); *F05B 2280/6011* (2013.01)

(56) References Cited

U.S. PATENT DOCUMENTS

| | | | |
|---|---|---|---|
| 4,643,646 A | | 2/1987 | Hahn et al. |
| 4,732,542 A | | 3/1988 | Hahn et al. |
| 5,281,454 A | | 1/1994 | Hanson |
| 6,474,869 B1 | * | 11/2002 | Sommerfeld ............ F16C 33/20 |
| | | | 384/909 |
| 7,334,989 B2 | | 2/2008 | Arelt |
| 7,344,360 B2 | | 3/2008 | Wetzel |
| 7,901,188 B2 | | 3/2011 | Llorente Gonzalez et al. |
| 7,922,454 B1 | | 4/2011 | Riddell |
| 7,927,077 B2 | | 4/2011 | Olson |
| 7,997,874 B2 | | 8/2011 | van der Bos |
| 7,998,303 B2 | | 8/2011 | Baehmann et al. |
| 8,123,488 B2 | | 2/2012 | Finnigan et al. |
| 8,297,932 B2 | | 10/2012 | Arocena De La Rua et al. |
| 8,348,622 B2 | | 1/2013 | Bech |
| 8,356,982 B2 | | 1/2013 | Petri Larrea et al. |
| 8,376,713 B2 | | 2/2013 | Kawasetsu et al. |
| 8,388,316 B2 | | 3/2013 | Arocena De La Rua et al. |
| 8,517,671 B2 | * | 8/2013 | Noda ..................... F03D 7/0224 |
| | | | 415/123 |
| 8,517,689 B2 | | 8/2013 | Kyriakides et al. |
| 8,568,034 B2 | * | 10/2013 | Johnson .................. B23P 11/02 |
| | | | 384/295 |
| 8,919,754 B2 | | 12/2014 | Schibsbye |
| 9,669,589 B2 | | 6/2017 | Zamora Rodriguez et al. |
| 2007/0018049 A1 | | 1/2007 | Stuhr |
| 2007/0253824 A1 | | 11/2007 | Eyb |
| 2009/0116962 A1 | | 5/2009 | Pedersen et al. |
| 2009/0155084 A1 | | 6/2009 | Livingston et al. |
| 2009/0162208 A1 | | 6/2009 | Zirin et al. |
| 2010/0132884 A1 | | 6/2010 | Baehmann et al. |
| 2010/0215494 A1 | | 8/2010 | Bech et al. |
| 2010/0304170 A1 | | 12/2010 | Frederiksen |
| 2011/0052403 A1 | | 3/2011 | Kawasetsu et al. |
| 2011/0081247 A1 | | 4/2011 | Hibbard |
| 2011/0081248 A1 | | 4/2011 | Hibbard |
| 2011/0091326 A1 | | 4/2011 | Hancock |
| 2011/0158788 A1 | | 6/2011 | Bech et al. |
| 2011/0158806 A1 | | 6/2011 | Arms et al. |
| 2011/0229336 A1 | | 9/2011 | Richter et al. |
| 2012/0093627 A1 | | 4/2012 | Christenson et al. |
| 2012/0114497 A1 | | 5/2012 | Peterson et al. |
| 2012/0196079 A1 | | 8/2012 | Brauers et al. |
| 2012/0213642 A1 | | 8/2012 | Wang et al. |
| 2012/0269643 A1 | | 10/2012 | Hibbard et al. |
| 2012/0308396 A1 | | 12/2012 | Hibbard |
| 2013/0040151 A1 | | 2/2013 | Jeromerajan et al. |
| 2013/0064663 A1 | | 3/2013 | Loth et al. |
| 2013/0129518 A1 | | 5/2013 | Hayden et al. |
| 2013/0164133 A1 | | 7/2013 | Grove-Nielsen |
| 2013/0177433 A1 | | 7/2013 | Fritz et al. |
| 2013/0189112 A1 | | 7/2013 | Hedges et al. |
| 2013/0189114 A1 | | 7/2013 | Jenzewski et al. |
| 2013/0219718 A1 | | 8/2013 | Busbey et al. |
| 2013/0224032 A1 | | 8/2013 | Busbey et al. |
| 2013/0236307 A1 | | 9/2013 | Stege |
| 2013/0236321 A1 | | 9/2013 | Olthoff |
| 2013/0330197 A1 | * | 12/2013 | Feigl ......................... F01D 5/30 |
| | | | 29/889.7 |
| 2014/0030096 A1 | * | 1/2014 | Dahl ..................... F03D 1/0658 |
| | | | 416/217 |
| 2014/0286780 A1 | | 9/2014 | Lemos et al. |
| 2015/0204200 A1 | | 7/2015 | Eyb et al. |
| 2015/0369211 A1 | * | 12/2015 | Merzhaeuser .......... F03D 80/30 |
| | | | 416/61 |
| 2016/0195060 A1 | | 7/2016 | Akhtar et al. |
| 2017/0089323 A1 | | 3/2017 | Yarbrough |
| 2017/0268482 A1 | * | 9/2017 | Beyland ................ F03D 1/0675 |
| 2017/0362945 A1 | | 12/2017 | Feigl |
| 2018/0051672 A1 | | 2/2018 | Merzhaeuser et al. |

FOREIGN PATENT DOCUMENTS

| | | |
|---|---|---|
| EP | 3425195 A1 | 1/2019 |
| FR | 2710871 A1 | 4/1995 |
| GB | 2477847 A | 8/2011 |
| WO | WO2009/034291 A2 | 3/2009 |
| WO | WO2009/077192 A2 | 6/2009 |
| WO | WO2010/023299 A2 | 3/2010 |
| WO | WO2011000381 A2 | 1/2011 |
| WO | WO2011/064553 A2 | 6/2011 |
| WO | WO2011/066279 A2 | 6/2011 |
| WO | WO2012084949 A1 | 6/2012 |
| WO | WO2015/051803 A1 | 4/2015 |
| WO | WO2015/185066 A1 | 12/2015 |

OTHER PUBLICATIONS

Homanfab, Loc-tite and a light press fit?, May 12, 2015, PracticalMachinist.com, thread #9, retrieved from the Interneton Feb. 10, 2023, URL: https://www.practicalmachinist.com/forum/threads/loc-tite-and-a-light-press-fit.303878/ (Year: 2015).*

International Search Report corresponding to PCTUS2018058699, dated Jul. 23, 2019.

JP foreign Office Action with translation for JP application No. 2021-522953, dated Aug. 24, 2022.

IN First Examination Report for IN application No. 202117019613, dated Dec. 6, 2022, 6 pages.

* cited by examiner

METHOD FOR INSTALLING AND RETAINING A BUSHING IN A BEARING BLOCK OF A ROTOR BLADE JOINT

FIELD

The present disclosure relates generally to wind turbines, and more particularly to a method for installing and retaining a bushing in a bearing block of a rotor blade joint.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. The spar caps and/or shear web may be constructed of various materials, including but not limited to glass fiber laminate composites and/or carbon fiber laminate composites.

In addition, as wind turbines continue to increase in size, the rotor blades also continue to increase in size. As such, modern rotor blades may be constructed in segments that are joined together at one or more joints. Further, certain jointed rotor blades may utilize pins to transfer the loads from the blade tip to the blade root. Moreover, the reactions from the pins are transferred to various bearing blocks at the joint locations via one or more bushings.

Accordingly, the present disclosure is directed to methods for installing and retaining such bushings in the bearing blocks at various joint locations.

BRIEF DESCRIPTION

Aspects and advantages of the invention will be set forth in part in the following description, or may be obvious from the description, or may be learned through practice of the invention.

In one aspect, the present disclosure is directed to a rotor blade for a wind turbine. The rotor blade includes a first blade segment and a second blade segment extending in opposite directions from a chord-wise joint. Each of the first and second blade segments includes at least one shell member defining an airfoil surface. The rotor blade also includes one or more pin joints for connecting the first and second blade segments at the chord-wise joint. The pin joint(s) includes one or more pin joint tubes received within the pin joint slot(s). The pin joint slot(s) are secured within a bearing block. Further, a gap is defined between the pin joint slot(s) and the bearing block. Moreover, the rotor blade includes a shim within the gap between the pin joint slot(s) and the bearing block so as to retain the pin joint slot(s) within the bearing block. In addition, the shim is constructed of a liquid material that hardens after being poured into the gap.

In one embodiment, the pin joint slot(s) may include one or more bushings. In such embodiments, the bushing(s) may further include a liner or a coating an outer surface and/or an inner surface of the one or more bushings or the one or more pin joint tubes. In another embodiment, the bushing(s) may be absent of a coating or liner. In addition, the bushing(s) may include a solid or hollow construction. In further embodiments, the bushing(s) may be constructed of one or more metal materials or one or more composite materials. For example, in one embodiment, the composite material may include a thermoset resin or a thermoplastic resin. In addition, the composite material may be optionally reinforced with one or more fiber materials, including but not limited to glass fibers, carbon fibers, polymer fibers, wood fibers, bamboo fibers, ceramic fibers, nanofibers, metal fibers, or combinations thereof.

In further embodiments, the gap may be a radial gap. In additional embodiments, the liquid material may include, for example, adhesive, caulk, a polymer material, a cementitious material, or any other material in a liquid or semi-liquid state at the point of installation that hardens after curing, thereby transferring the load from the bushing(s) to the bearing block.

In several embodiments, the pin joint slot(s) may also include one or more tabs so as to prevent rotation of the pin joint slot(s) with respect to the bearing block. In such embodiments, the liquid material covers the tab(s) once hardened so as to secure the tab(s) in place.

In another aspect, the present disclosure is directed to a method for assembling a rotor blade of a wind turbine. The method includes forming a first blade segment and a second blade segment. Each of the first and second blade segments includes at least one shell member defining an airfoil surface. The method also includes forming one or more openings in a bearing block of at least one of the first blade segment or the second blade segment. Further, the method includes placing one or more pin joint slots within the opening(s) of the bearing block of the first blade segment and/or the second blade segment. As such, a radial gap is defined between the pin joint slot(s) and the opening(s) of the bearing block. Moreover, the method includes filling the radial gap between the pin joint slot(s) and the opening(s) of the bearing block with a liquid material that hardens after filling the gap so as to retain the pin joint slot(s) within the bearing block. In addition, the method includes arranging the first and second blade segments in opposite directions from a chord-wise joint. As such, the method further includes connecting the chord-wise joint via one or more pin joint tubes received within the pin joint slot(s). It should be understood that the method may further include any of the additional steps and/or features as described herein.

In yet another aspect, the present disclosure is directed to a method for assembling a rotor blade of a wind turbine. The method includes forming a first blade segment and a second blade segment. Each of the first and second blade segments includes at least one shell member defining an airfoil surface. The method also includes forming one or more openings in a bearing block of the first blade segment or the second blade segment. Further, the method includes inserting the pin joint slot(s) within the opening(s) of the bearing block of the first blade segment and/or the second blade segment. Moreover, the method includes shrink fitting the pin joint slot(s) within the opening(s) to provide an interference fit between the pin joint slot(s) and the opening(s). In addition, the method includes arranging the first and second blade segments in opposite directions from a chord-wise joint. Thus, the method also includes connecting the chord-wise joint via one or more pin joint tube(s) received within the pin joint slot(s).

In one embodiment, shrink fitting the pin joint slot(s) within the opening(s) to provide the interference fit may include, for example, reducing a temperature of the pin joint slot(s) so as to shrink the pin joint slot(s) and subsequently inserting the pin joint slot(s) within the opening(s) of the bearing block of the first blade segment and/or the second blade segment. Thus, as the pin joint slot(s) heat back up, the pin joint slot(s) expand to provide an interference fit with the opening(s). In another embodiment, the shrink fit may be achieved by pressing the pin joint slot(s) into the opening(s) where the slot diameter is greater than the hole diameter to achieve the desired interference fit.

In alternative embodiments, shrink fitting the pin joint slot(s) within the opening(s) to provide the interference fit may include, for example, increasing a temperature of the opening(s) of the bearing block after inserting the pin joint slot(s) within the opening(s) of the bearing block so as to expand the opening(s), wherein expansion of the opening(s) provides the interference fit between the pin joint slot(s) and the opening(s). In yet another embodiment, the method may include tapering the one or more pin joint slots and/or the bearing block to allow for positioning of the one or more pin joint slots and/or the bearing block with respect to the other. It should be understood that the method may further include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
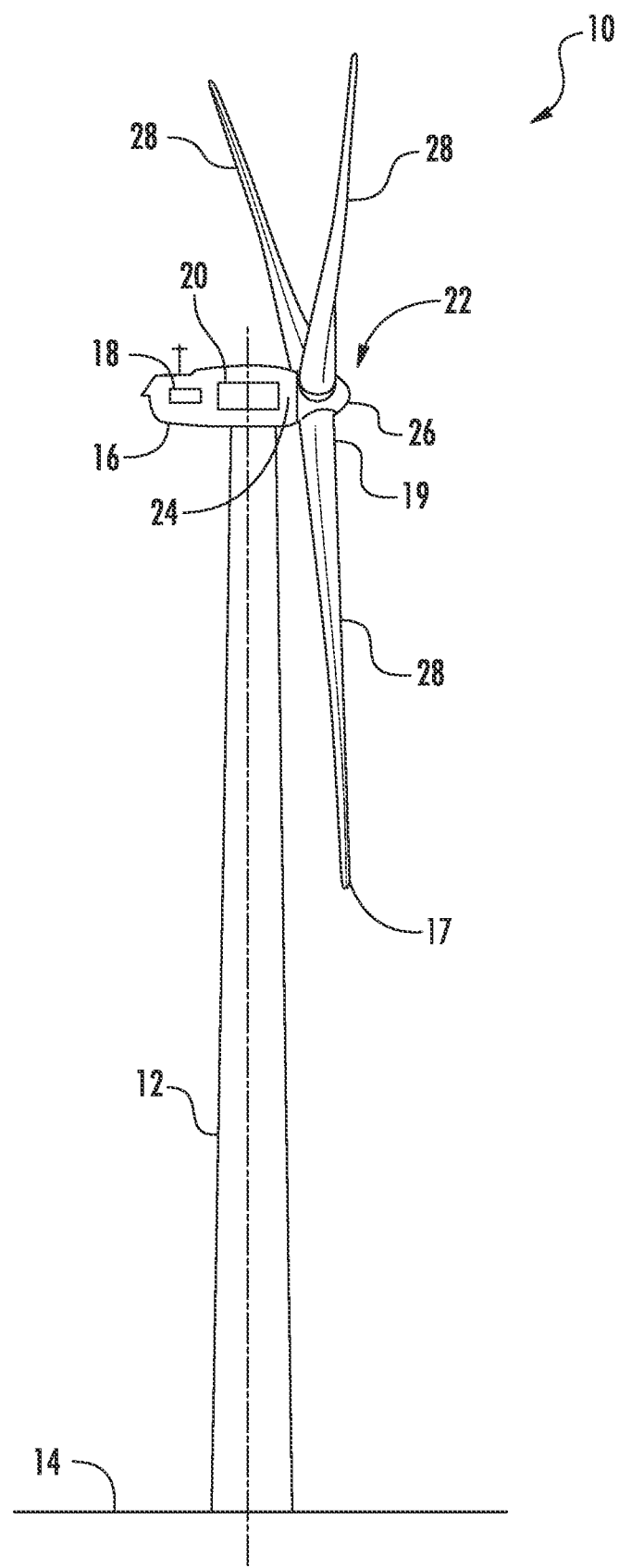
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10 according to the present invention. In the illustrated embodiment, the wind turbine 10 is a horizontal-axis wind turbine. Alternatively, the wind turbine 10 may be a vertical-axis wind turbine. In addition, as shown, the wind turbine 10 may include a tower 12 that extends from a support surface 14, a nacelle 16 mounted on the tower 12, a generator 18 positioned within the nacelle 16, a gearbox 20 coupled to the generator 18, and a rotor 22 that is rotationally coupled to the gearbox 20 with a rotor shaft 24. Further, as shown, the rotor 22 includes a rotatable hub 26 and at least one rotor blade 28 coupled to and extending outward from the rotatable hub 26. As shown, the rotor blade 28 includes a blade tip 17 and a blade root 19.

Figure 2:
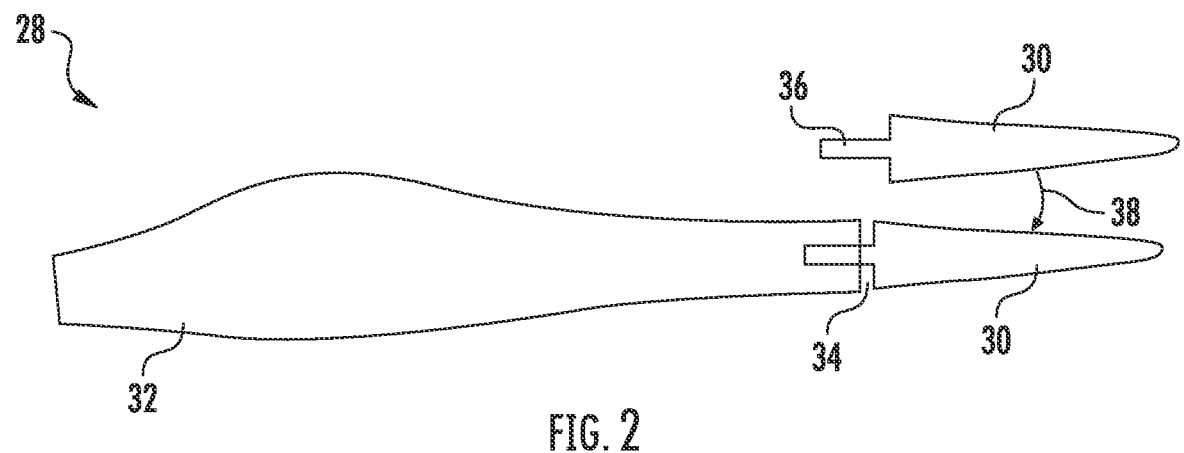
FIG. 2 illustrates a plan view of one embodiment of a rotor blade having a first blade segment and a second blade segment according to the present disclosure.

Referring now to FIG. 2, a plan view of one of the rotor blades 28 of FIG. 1 is illustrated. As shown, the rotor blade 28 may include a first blade segment 30 and a second blade segment 32. Further, as shown, the first blade segment 30 and the second blade segment 32 may each extend in opposite directions from a chord-wise joint 34. In addition, as shown, each of the blade segments 30, 32 may include a at least one shell member defining an airfoil surface. The first blade segment 30 and the second blade segment 32 are connected by at least an internal support structure 36 extending into both blade segments 30, 32 to facilitate joining of the blade segments 30, 32. The arrow 38 shows that the segmented rotor blade 28 in the illustrated example includes two blade segments 30, 32 and that these blade segments 30, 32 are joined by inserting the internal support structure 36 into the second blade segment 32. In addition, as shown, the second blade segment includes multiple spar structures 66 (also referred to herein as spar caps) that extend lengthwise for connecting with a blade root section 35 of the rotor blade 28 (which is shown in more detail in FIG. 7) and with the beam structure 40 of the first blade segment 30 (which is shown in more detail in FIG. 5).

Figure 3:
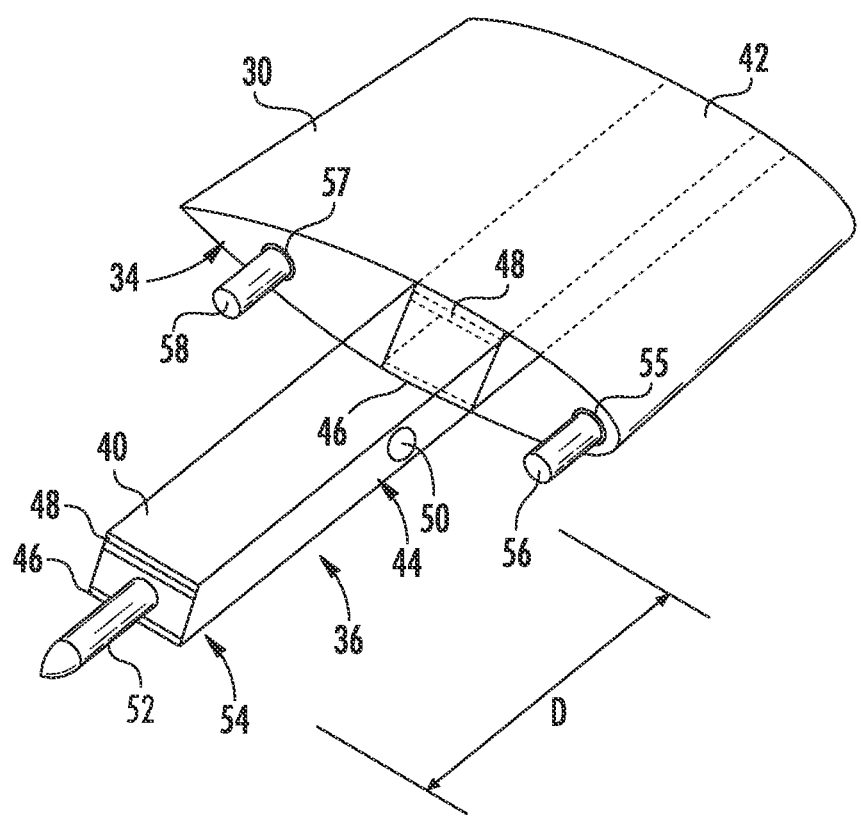
FIG. 3 illustrates a perspective view of a section of one embodiment of the first blade segment according to the present disclosure.

Referring now to FIG. 3, a perspective view of a section of the first blade segment 30 according to the present disclosure is illustrated. As shown, the first blade segment 30 includes a beam structure 40 that forms a portion of the internal support structure 36 and extends lengthwise for structurally connecting with the second blade segment 32. Further, as shown, the beam structure 40 forms a part of the first blade segment 30 having an extension protruding from a spar section 42, thereby forming an extending spar section. The beam structure 40 includes a shear web 44 connected with a suction side spar cap 46 and a pressure side spar cap 48.

Moreover, as shown, the first blade segment 30 may include one or more first pin joints towards a first end 54 of the beam structure 40. In one embodiment, the pin joint may include a pin that is in a tight interference fit with a bushing. More specifically, as shown, the pin joint(s) may include one pin tube 52 located on the beam structure 40. Thus, as shown, the pin tube 52 may be oriented in a span-wise direction. Further, the first blade segment 30 may also include a pin joint slot 50 located on the beam structure 40 proximate to the chord-wise joint 34. Moreover, as shown, the pin joint slot 50 may be oriented in a chord-wise direction. In one example, there may be a bushing within the pin joint slot 50 arranged in a tight interference fit with a pin tube or pin (shown as pin 53 in FIG. 6). Further, the first blade segment 30 may include multiple second pin joint tubes 56, 58 located at the chord-wise joint 34. Thus, as shown, the second pin joint tubes 56, 58 may include a leading edge pin joint tube 56 and a trailing edge pin joint tube 58. Further, each of the second pin joint tubes 56, 58 may be oriented in a span-wise direction. In addition, as shown, each of the second pin joint tubes 56, 58 may include multiple flanges 55, 57, respectively, that are configured to distribute compression loads at the chord-wise joint 34.

It is to be noted that the pin tube 52 located at the first end of the beam structure 40 may be separated span-wise with the multiple second pin joint tubes 56, 58 located at the chord-wise joint 34 by an optimal distance D. This optimal distance D may be such that the chord-wise joint 34 is able to withstand substantial bending moments caused due to shear loads acting on the chord-wise joint 34. In another embodiment, each of the pin joints connecting the first and second blade segments 30, 32 may include an interference-fit steel bushed joint.

Figure 4:
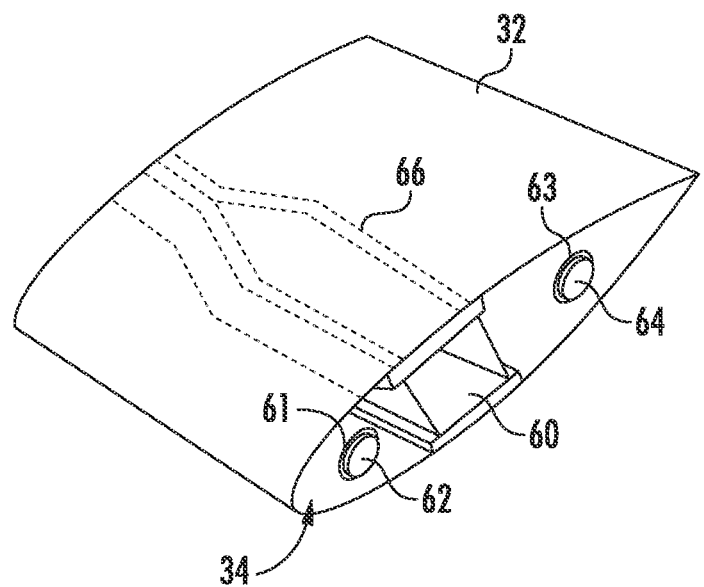
FIG. 4 illustrates a perspective view of one embodiment of a section of the second blade segment at the chord-wise joint according to the present disclosure.

Referring now to FIG. 4, a perspective view of a section of the second blade segment 32 at the chord-wise joint 34 according to the present disclosure is illustrated. As shown, the second blade segment 32 includes a receiving section 60 extending lengthwise within the second blade segment 32 for receiving the beam structure 40 of the first blade segment 30. The receiving section 60 includes the spar structures 66 that extend lengthwise for connecting with the beam structure 40 of the first blade segment 30. As shown, the second blade segment 32 may further include pin joint slots 62, 64 for receiving pin joint tubes 56, 58 (shown in FIG. 3) of the first blade segment 30 and forming tight interference fittings. In one example, each of the multiple pin joint slots 62, 64 may include multiple flanges 61, 63, respectively, that are configured to distribute compression loads at the chord-wise joint 34.

Figure 5:
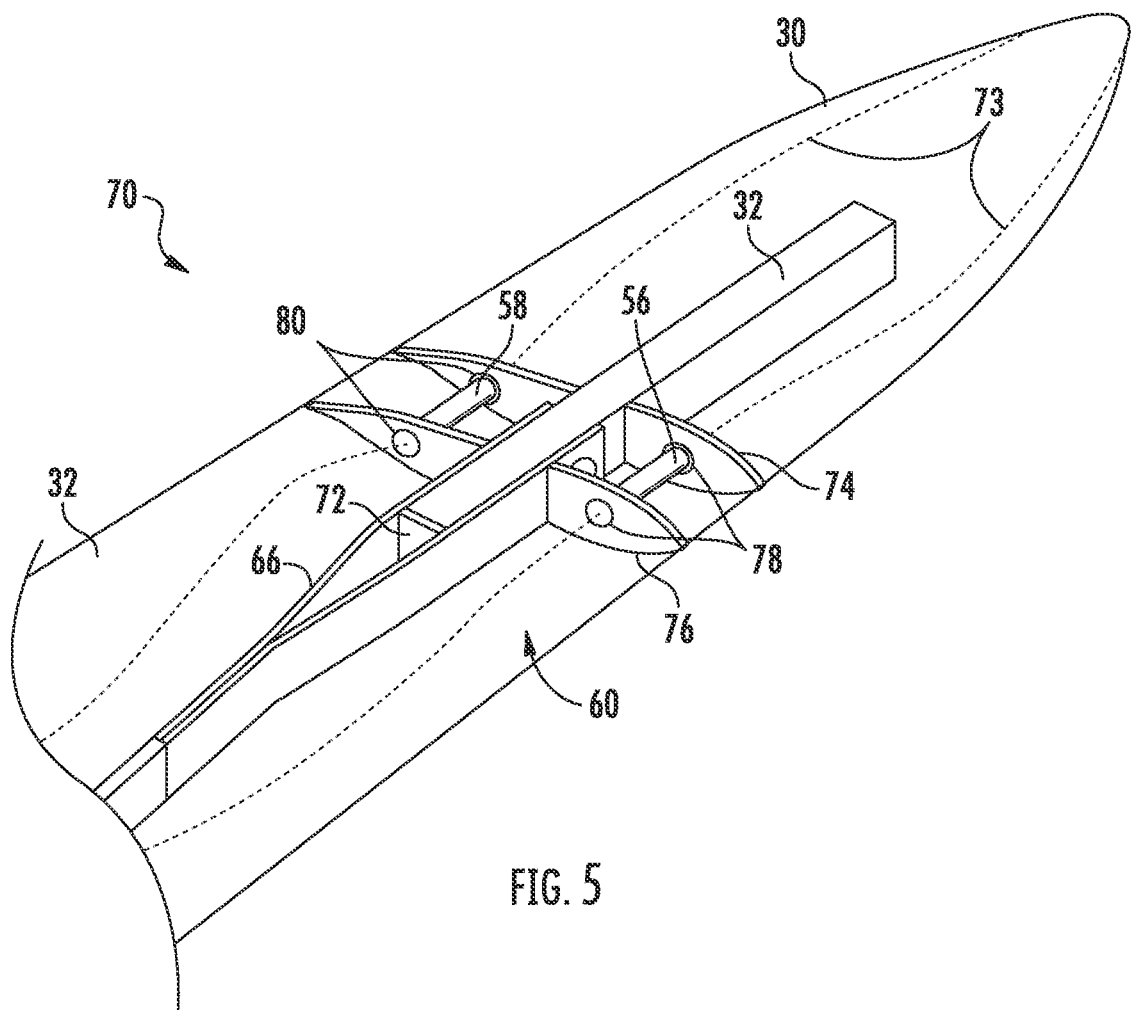
FIG. 5 illustrates an assembly of one embodiment of the rotor blade of the wind turbine having the first blade segment joined with the second blade segment according to the present disclosure.

Referring now to FIG. 5, an assembly 70 of the rotor blade 28 having the first blade segment 30 joined with the second blade segment 32 according to the present disclosure is illustrated. As shown, the assembly 70 illustrates multiple supporting structures beneath outer shell members of the rotor blade 28 having the first blade segment 30 joined with the second blade segment 32. Further, as shown, the receiving section 60 includes the multiple spar structures 66 extending lengthwise and supports the beam structure 40. The receiving section 60 also includes a rectangular fastening element 72 that connects with the pin tube 52 of the beam structure 40 in the span-wise direction. Further, the first and the second blade segments 30, 32 may also include chord-wise members 74, 76 respectively at the chord-wise joint 34. Further, as shown, the chord-wise members 74, 76 may include leading edge pin openings 78 and trailing edge pin openings 80 that allows pin joint connections between the first and second blade segments 30, 32. For example, as shown, the chord-wise members 74, 76 are connected by pin joint tubes 56 and 58 that are in tight interference fit with bushings located in the leading edge pin openings 78 and the trailing edge pin openings 80. In another embodiment, each of the spar structures 66, the rectangular fastening element 72, and the chord-wise members 74, 76 may be constructed of glass reinforced fibers. In this example, the assembly 70 may also include multiple lightening receptor cables 73 that are embedded between the multiple pin joint tubes or pins 56, 58 and the bushing connections attached to the chord-wise members 74, 76.

Figure 6:
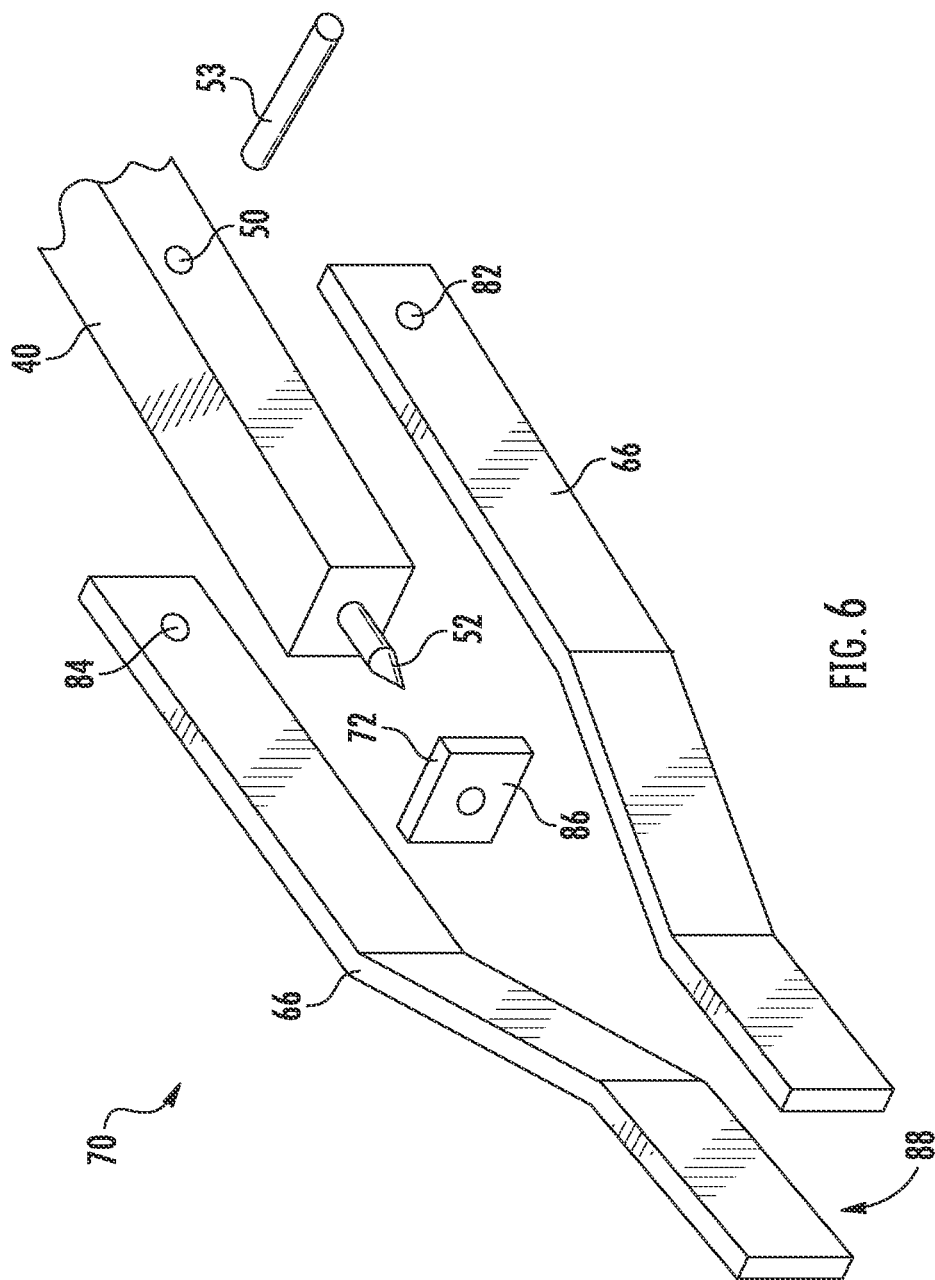
FIG. 6 illustrates an exploded perspective view of one embodiment of the multiple supporting structures of the assembly of the rotor blade of the wind turbine according to the present disclosure.

Referring now to FIG. 6, an exploded perspective view of the multiple supporting structures of the assembly 70 towards the receiving section 60 of the rotor blade 28 is illustrated. As shown, a pair of spar structures 66 is configured to receive the beam structure 40 and includes pin joint slots 82, 84 that are aligned with the pin joint slot 50 of the beam structure 40 through which a pin tube or pin 53 may be inserted. Further, the pin 53 is configured to remain in a tight interference fit within the aligning pin joint slots 82, 50, 84 such that spar structures 66 and the beam structure 40 are joined together by during assembling. Further, FIG. 6 also illustrates the rectangular fastening element 72 that includes a pin joint slot 86 configured for receiving the pin tube 52 of the beam structure 40. As such, the pin tube 52 may be configured to form a tight interference fit pined joint. Further, the pair of spar structures 66 may be joined together at one end 88 using any suitable adhesive material or an elastomeric seal.

Figure 7:
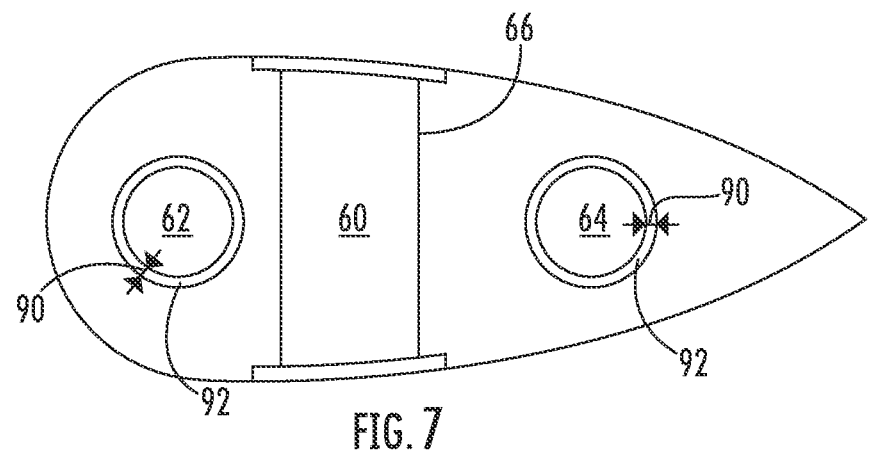
FIG. 7 illustrates a cross-sectional view of one embodiment of a rotor blade of a wind turbine at a chord-wise joint according to the present disclosure, particularly illustrating the bold joint slots retained within the bearing block via a shim.

Referring to FIG. 7, the pin joint slot(s) 62, 64 may be installed and retained within a bearing block 68 (similar to or synonymous with the chord-wise members 74, 76). More specifically, as shown in FIG. 7, the bearing block 68 corresponds to a chord-wise member or bulkhead located at the chord-wise joint 34. In additional embodiments, the bearing block 68 may correspond to the first end 54 of the beam structure 40 and/or any other suitable location along a span-wise or chord-wise location of the beam structure 40 and/or the receiving section 60. In other words, the bearing block 68 may refer to any location on or within the rotor blade 28 where a pin joint slot or bushing can be placed or installed.

In one embodiment, the pin joint slot(s) 62, 64 described herein may include one or more bushings. For example, as shown, the pin joint slot(s) 62, 64 may be sized such that a gap 90 is defined between the respective pin joint slot(s) 62, 64 and the bearing block 68. More specifically, as shown, the gap 90 may be a radial gap. Thus, as shown, the rotor blade 28 may include a shim 92 within the gap 90 between the respective pin joint slot(s) 62, 64 and the bearing block 68 so as to retain the pin joint slot(s) 62, 64 within the bearing block 68. More specifically, in certain embodiments, the shim 92 may be constructed of a liquid material that hardens after being poured into the gap 90. For example, in certain embodiments, the liquid material may include, for example, adhesive, caulk, a polymer material, a cementitious material, or any other material in a liquid or semi-liquid state at the point of installation that hardens after curing, thereby transferring the load from the bushing(s) to the bearing block 68.

Figure 8:
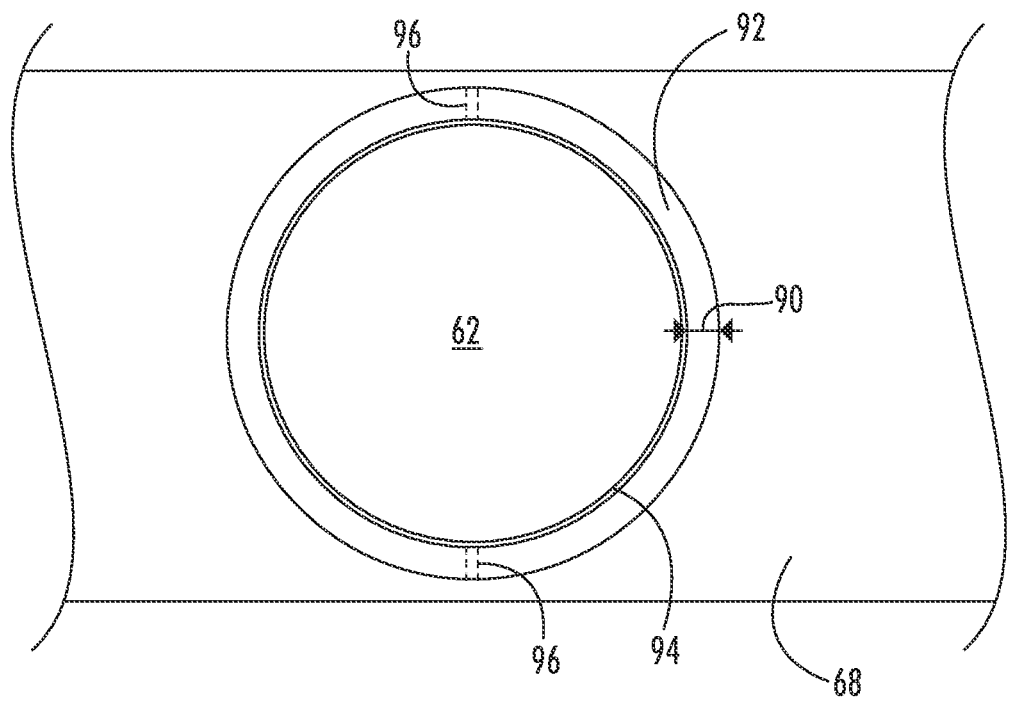
FIG. 8 illustrates a detailed view of a portion of the rotor blade of FIG. 7.

Referring now to FIG. 8, in certain embodiments, the bushing(s) 62, 64 may further include a liner 94 or a coating on an inner or outer surface thereof, e.g. on an exterior circumferential surface thereof. As such, the liner/coating 94 may further assist in retaining the bushing(s) 62, 64 within the bearing block 68. In addition, the lined bushing(s) 62, 64 are configured to provide improved wear resistance with respect to the corresponding pin joint tubes received therein. The liner/coating material 94 may include a single material or a combination of different materials so as to provide the desired wear resistance. Further, the liner/coating material 94 can be attached to the bushing(s) 62, 64 via press fit or bonding.

Similarly, the various pin joint tubes 52, 56, 58 described herein may also be lined or coated so as to improve the wear resistance thereof and/or to provide a desired wear couple between the pin joint tubes and the bushings. As mentioned, the liner/coating material may include a single material or a combination of different materials so as to provide the desired wear resistance. In alternative embodiments, the pin joint tubes 52, 56, 58 may be left uncoated or unlined and provided with a high surface finish.

In addition, as shown, the pin joint slot(s) 62, 64 may also include one or more tabs 96 configured to prevent rotation of the pin joint slot(s) 62, 64 with respect to the bearing block 68. In such embodiments, the liquid material/shim 92 may cover the tab(s) 96, i.e. once hardened so as to secure the tab(s) 96 in place. In addition, the concentricity of the pin joint slot(s) 62, 64 within the bearing block 68 should be maintained. In such embodiments, the concentricity of the pin joint slot(s) 62, 64 within the bearing block 68 may be maintained via the liquid material 92 within the radial gap 90.

The bushing(s) 62, 64 described herein may be constructed of one or more metal materials or one or more composite materials. For example, in one embodiment, the composite material may include a thermoset resin or a thermoplastic resin. The thermoplastic materials as described herein may generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, the thermoset materials as described herein may generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

In addition, the composite material may be optionally reinforced with one or more fiber materials, including but not limited to glass fibers, carbon fibers, polymer fibers, wood fibers, bamboo fibers, ceramic fibers, nanofibers, metal fibers, or combinations thereof. In addition, the direction or orientation of the fibers may include quasi-isotropic, multi-axial, unidirectional, biaxial, triaxial, or any other another suitable direction and/or combinations thereof.

Figure 9:
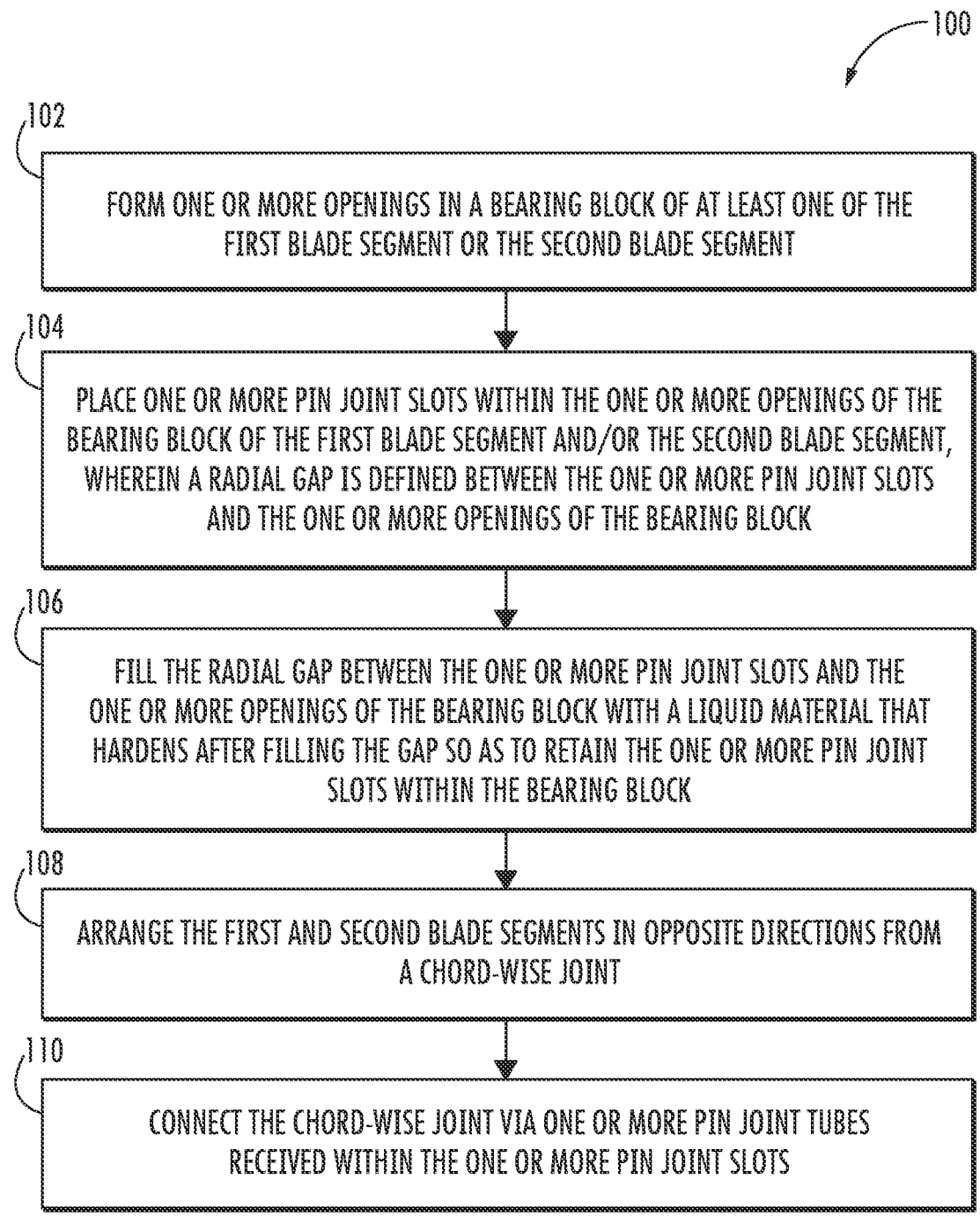
FIG. 9 illustrates a flow chart of one embodiment of a method of assembling a rotor blade of a wind turbine according to the present disclosure.

Referring now to FIG. 9, a flow chart 100 of a method for assembling a rotor blade of a wind turbine according to the present disclosure is illustrated. In general, the method 100 will be described herein with reference to the wind turbine 10 and the rotor blade 28 shown in FIGS. 1-8. However, it should be appreciated that the disclosed method 100 may be implemented with rotor blades having any other suitable configurations. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (102), the method 100 may include forming the first blade segment 30 and the second blade segment 32. As shown at (104), the method 100 may include forming one or more openings in the bearing block 68 of the first blade segment 30 and/or the second blade segment 32. As shown at (106), the method 100 may include placing one or more pin joint slots 62, 64 within the opening(s) of the bearing block 68 of the first blade segment 30 and/or the second blade segment 32. As such, a radial gap 90 is defined between the pin joint slot(s) 62, 64 and the opening(s) of the bearing block 68. As shown at (108), the method 100 may include filling the radial gap 90 between the pin joint slot(s) 62, 64 and the opening(s) of the bearing block 68 with a liquid material that hardens after filling the gap 90 so as to retain the pin joint slot(s) 62, 64 within the bearing block 68. As shown at (110), the method 100 may include arranging the first and second blade segments 30, 32 in opposite directions from a chord-wise joint 34. As shown at (112), the method 100 may include connecting the chord-wise joint 34 via one or more pin joint tubes 56, 58 received within the pin joint slot(s) 62, 64.

Figure 10:
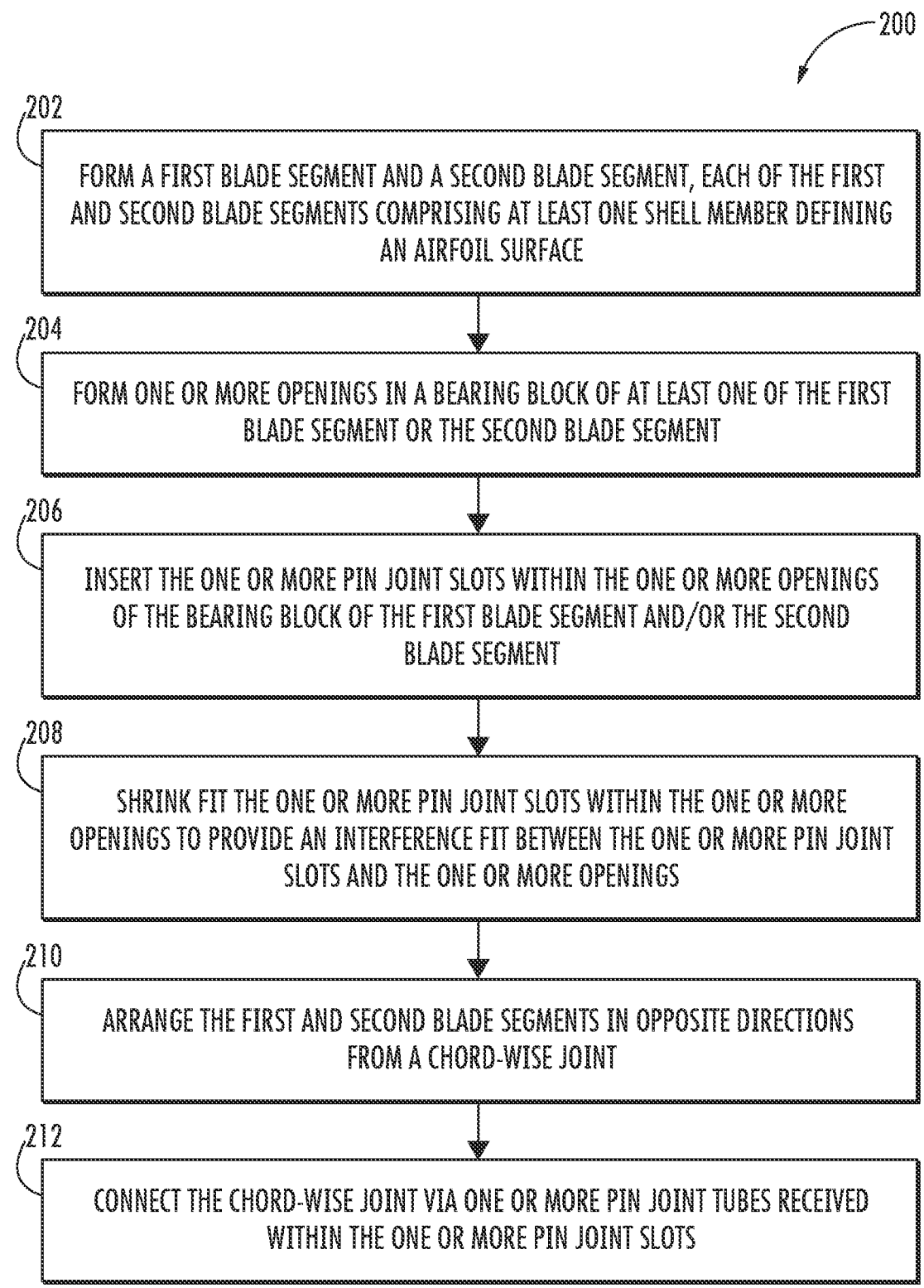
FIG. 10 illustrates a flow chart of another embodiment of a method of assembling a rotor blade of a wind turbine according to the present disclosure.

Referring now to FIG. 10, a flow chart 200 of a method for assembling a rotor blade of a wind turbine according to the present disclosure is illustrated. In general, the method 200 will be described herein with reference to the wind turbine 10 and the rotor blade 28 shown in FIGS. 1-8. However, it should be appreciated that the disclosed method 200 may be implemented with rotor blades having any other suitable configurations. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 may include forming the first blade segment 30 and the second blade segment 32. As shown at (204), the method 200 may include forming one or more openings in the bearing block 68 of the first blade segment 30 or the second blade segment 32. As shown at (206), the method 200 may include inserting the pin joint slot(s) 62, 64 within the opening(s) of the bearing block 68 of the first blade segment 30 and/or the second blade segment 32. As shown at (208), the method 200 may include shrink fitting the pin joint slot(s) 62, 64 within the opening(s) to provide an interference fit between the pin joint slot(s) 62, 64 and the opening(s). In one embodiment, the pin joint slot(s) 62, 64 may be shrink fitted within the opening(s), for example, by reducing a temperature of the pin joint slot(s) 62, 64 so as to shrink the pin joint slot(s) 62, 64 and subsequently inserting the pin joint slot(s) 62, 64 within the opening(s) of the bearing block 68 of the first blade segment 30 and/or the second blade segment 32. Thus, as the pin joint slot(s) 62, 64 heat back up, the slot(s) 62, 64 expand to provide an interference fit with the opening(s). In alternative embodiments, the pin joint slot(s) 62, 64 may be shrink fitted within the opening(s), for example, by increasing a temperature of the bearing block 68 after inserting the pin joint slot(s) 62, 64 within the opening(s) of the bearing block 68 so as to expand the opening(s), wherein expansion of the opening(s) provides the interference fit between the pin joint slot(s) 62, 64 and the opening(s).

Thus, after the pin joint tube(s) 62, 64 are adequately retained in the bearing block 68, as shown at (210), the method 200 may include arranging the first and second blade segments 30, 32 in opposite directions from the chord-wise joint 34. As shown at (212), the method 200 may include connecting the chord-wise joint 34 via the pin joint tube(s) 56, 58 received within the pin joint slot(s) 62, 64.

The skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for assembling a rotor blade of a wind turbine, the method comprising:
   forming a first blade segment and a second blade segment, each of the first and second blade segments comprising at least one shell member defining an airfoil surface;
   forming one or more openings in a bearing block of at least one of the first blade segment or the second blade segment;
   inserting one or more pin joint slots within the one or more openings of the bearing block of the first blade segment and/or the second blade segment, wherein the one or more pin joint slots comprise one or more bushings;
   placing at least one of a liner or a coating on an outer surface of the one or more bushings, wherein the liner or coating assists in retaining the bushing within the bearing block;
   shrink fitting the one or more pin joint slots within the one or more openings to provide an interference fit between the one or more pin joint slots and the one or more openings;
   arranging the first and second blade segments in opposite directions from the chord-wise joint;
   placing at least one of a liner or a coating on one or more pin joint tubes received within the one or more pin joint slots; and
   connecting the chord-wise joint via the one or more pin joint tubes received within the one or more pin joint slots.

2. The method of claim 1, wherein shrink fitting the one or more pin joint slots within the one or more openings to provide the interference fit between the one or more pin joint slots and the one or more openings further comprises:
   reducing a temperature of the one or more pin joint slots so as to shrink the one or more pin joint slots; and,
   subsequently inserting the one or more pin joint slots within the one or more openings of the bearing block of the first blade segment and/or the second blade segment, wherein as the one or more pin joint slots heat up, the one or more pin joint slots expand to provide an interference fit with the one or more openings.

3. The method of claim 1, wherein shrink fitting the one or more pin joint slots within the one or more openings to provide the interference fit between the one or more pin joint slots and the one or more openings further comprises:
   increasing a temperature of the one or more openings of the bearing block after inserting the one or more pin joint slots within the one or more openings of the bearing block so as to expand the one or more openings, wherein expansion of the one or more openings provides the interference fit between the one or more pin joint slots and the one or more openings.

4. The method of claim 1, wherein the one or more bushings are constructed of at least one of one or more metal materials or one or more composite materials.

5. The method of claim 4, wherein the composite material comprises at least one of a thermoset resin or a thermoplastic resin, the composite material optionally reinforced with one or more fiber materials, the one or more fiber materials comprising at least one of glass fibers, carbon fibers, polymer fibers, wood fibers, bamboo fibers, ceramic fibers, nanofibers, metal fibers, or combinations thereof.

6. The method of claim 1, wherein the one or more pin joint slots further comprises one or more tabs so as to prevent rotation of the one or more pin joint slots with respect to the bearing block.

\* \* \* \* \*